United States Patent
Gaber et al.

(10) Patent No.: US 10,102,055 B1
(45) Date of Patent: Oct. 16, 2018

(54) DATA DRIVEN CONVERGED INFRASTRUCTURE COMPONENTS EVALUATION

(71) Applicant: EMC Corporation, Hopkinton, MA (US)

(72) Inventors: Shiri Gaber, Beer-Sheva (IL); Oshry Ben-Harush, Galon (IL); Alon J. Grubshtein, Lehavim (IL); Lena Tenenboim-Chekina, Omer (IL); Raphael Cohen, Beer-Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 70 days.

(21) Appl. No.: 15/077,372

(22) Filed: Mar. 22, 2016

(51) Int. Cl.
  *G06F 11/00* (2006.01)
  *G06F 11/07* (2006.01)

(52) U.S. Cl.
  CPC ........ *G06F 11/079* (2013.01); *G06F 11/0709* (2013.01); *G06F 11/0754* (2013.01); *G06F 11/0787* (2013.01)

(58) Field of Classification Search
  CPC ............. G06F 11/0709; G06F 11/0751; G06F 11/0754; G06F 11/0787; G06F 11/079
  See application file for complete search history.

(56) References Cited

U.S. PATENT DOCUMENTS

| | | | | |
|---|---|---|---|---|
| 5,919,267 A | * | 7/1999 | Urnes ................. | G06F 11/0736 714/26 |
| 6,067,412 A | * | 5/2000 | Blake ................. | G06F 11/3409 714/E11.192 |
| 7,310,590 B1 | * | 12/2007 | Bansal ................ | G06F 11/0715 702/181 |
| 8,055,493 B2 | | 11/2011 | Rolia et al. | |
| 9,684,527 B1 | * | 6/2017 | Hayward ............ | G06F 9/44505 |
| 9,736,046 B1 | * | 8/2017 | Jain ..................... | H04L 43/0823 |

(Continued)

FOREIGN PATENT DOCUMENTS

| | | |
|---|---|---|
| WO | 2004100041 A2 | 11/2004 |
| WO | 2015106038 A1 | 7/2015 |
| WO | 2015164023 A1 | 10/2015 |

*Primary Examiner* — Joshua P Lottich
(74) *Attorney, Agent, or Firm* — Ryan, Mason & Lewis, LLP (57) ABSTRACT

An apparatus comprises a processing platform configured to implement an analytic engine for evaluation of at least one of a converged infrastructure environment and one or more components of the converged infrastructure environment. The analytic engine comprises an extraction module configured to extract one or more features corresponding to the converged infrastructure environment, a learning and modeling module configured to predict an expected quantitative performance value of at least one of the converged infrastructure environment and the one or more components of the converged infrastructure environment based on the extracted one or more features, and comparison and ranking modules. The comparison module is configured to calculate a difference between an actual quantitative performance value of at least one of the converged infrastructure environment and the one or more components of the converged infrastructure environment and the expected quantitative performance value. The ranking module determines anomalies based on the difference.

20 Claims, 5 Drawing Sheets

(56) References Cited

U.S. PATENT DOCUMENTS

| | | | |
|---|---|---|---|
| 2008/0126413 A1* | 5/2008 | Addleman | G06F 11/0709 |
| 2008/0271038 A1 | 10/2008 | Rolia et al. | |
| 2010/0058345 A1* | 3/2010 | Seidman | G06F 11/3419 |
| | | | 718/101 |
| 2012/0022700 A1* | 1/2012 | Drees | G05B 15/02 |
| | | | 700/276 |
| 2012/0144374 A1* | 6/2012 | Gallagher | G06F 11/3466 |
| | | | 717/128 |
| 2012/0209618 A1 | 8/2012 | Compton et al. | |
| 2014/0351426 A1 | 11/2014 | Madani et al. | |
| 2014/0351646 A1 | 11/2014 | Madani et al. | |
| 2015/0134622 A1* | 5/2015 | Ebel | H04L 67/30 |
| | | | 707/690 |
| 2016/0098337 A1* | 4/2016 | Ekambaram | G06F 11/3409 |
| | | | 719/318 |
| 2017/0017537 A1* | 1/2017 | Razin | G06F 11/079 |
| 2017/0109222 A1* | 4/2017 | Singh | G06F 11/0709 |
| 2017/0139762 A1* | 5/2017 | Sherlock | G06F 11/079 |
| 2017/0160842 A1* | 6/2017 | Shimada | G06F 3/048 |

* cited by examiner

DATA DRIVEN CONVERGED INFRASTRUCTURE COMPONENTS EVALUATION

FIELD

The field relates generally to information processing systems, and more particularly to techniques for evaluating components within converged infrastructure environments.

BACKGROUND

Converged infrastructure ("CI") systems are intricately built for scale. A typical CI system can be composed of thousands of different parts, where no two CI systems are alike. Due to their inherent complexity, a direct evaluation of the CI systems' performance ignores the properties of the infrastructure of the CI system, and would lead to unreliable results. As an example, considering the impact of having different types and numbers of serial advanced technology attachments (SATAs), fiber and flash drives on two CI installations is highly non-trivial. Traditional statistical approaches for measuring performance and identifying anomalies in reliability in CI systems are based on the assumption of a homogeneous population, that is, a population of identical products and parts. Further, sorting and optimizing by business measures, such as, for example, central processing unit (CPU) or memory usage, response time, number of issues, or customer service expense, do not take CI system complexity into account. As a result, CI system evaluations may include false alarms and inaccurate results.

SUMMARY

Illustrative embodiments of the present invention account for different properties within a heterogeneous population of CI environments.

In one embodiment, an apparatus comprises a processing platform configured to implement an analytic engine for evaluation of at least one of a converged infrastructure environment and one or more components of the converged infrastructure environment.

The analytic engine comprises an extraction module configured to extract one or more features corresponding to the converged infrastructure environment, and a learning and modeling module configured to predict an expected quantitative performance value of at least one of the converged infrastructure environment and the one or more components of the converged infrastructure environment based on the extracted one or more features. The analytic engine further comprises a comparison module and a ranking module.

The comparison module is configured to calculate a difference between an actual quantitative performance value of at least one of the converged infrastructure environment and the one or more components of the converged infrastructure environment and the expected quantitative performance value. The ranking module is configured to determine whether at least one of the converged infrastructure environment and the one or more components is anomalous based on whether the difference between the actual quantitative performance value and the expected quantitative performance value exceeds a statistically derived threshold.

In some embodiments, the ranking module is configured to determine whether a version of the one or more components is anomalous using statistically derived values computed based on a plurality of converged infrastructure environments implementing different versions of the one or more components.

The predicting can be performed using a multivariate predictive model in which the extracted one or more features are input variables, and the learning and modeling module can be configured to implement machine learning processing to learn one or more normalization coefficients to be applied to the extracted one or more features when using the multivariate predictive model to predict the expected quantitative performance value of at least one of the converged infrastructure environment and the one or more components.

Illustrative embodiments described herein provide significant improvements relative to conventional arrangements. For example, one or more such embodiments utilize supervised machine learning to predict expected performance values of a CI environment and/or of one or more components of the CI environment. Differences between actual and expected performance values of a CI environment as a whole or one or more components of the CI environment can be calculated to identify the existence of anomalous CI environments or CI components.

These and other embodiments include, without limitation, methods, apparatus, systems, and processor-readable storage media.

DETAILED DESCRIPTION

Illustrative embodiments of the present invention will be described herein with reference to exemplary information processing systems and associated processing platforms each comprising one or more processing devices, computers, servers, storage devices and other processing devices. It is to be appreciated, however, that embodiments of the invention are not restricted to use with the particular illustrative system, platform and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

Figure 1:
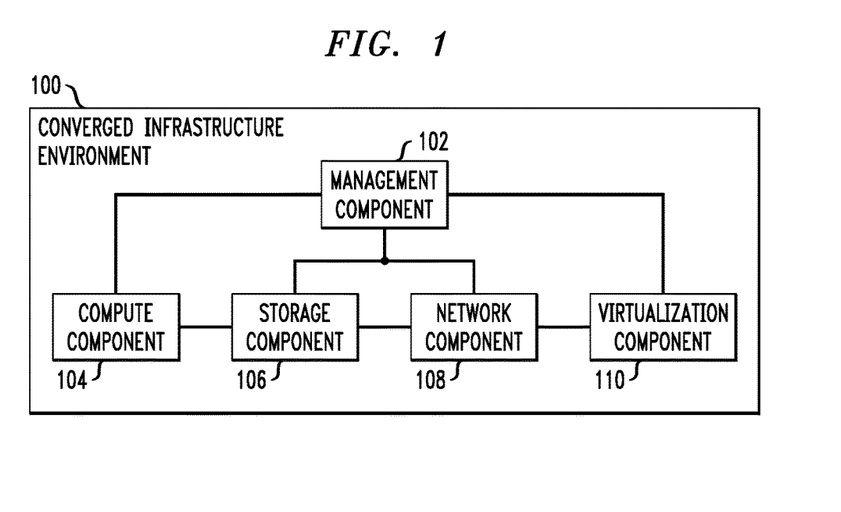
FIG. 1 is a block diagram of a converged infrastructure environment in an illustrative embodiment of the invention.

FIG. 1 is a block diagram of a converged infrastructure ("CI") environment in an illustrative embodiment of the invention. Referring to FIG. 1, the CI environment 100 is a system that includes a management component 102, a compute component 104, a storage component 106, a network component 108 and a virtualization component 110. In general, the CI environment can be used to power data centers and simplify management and operations during a lifecycle of its components. Examples of CI environments include VBLOCK®, VxBLOCK®, VxRACK™ and VxRAIL™ CI systems, commercially available from VCE Company LLC of Richardson, Tex., a subsidiary of EMC Corporation of Hopkinton, Mass.

CI environments include an assembled infrastructure which brings together, for example, management, compute, storage, network and virtualization components 102, 104, 106, 108 and 110 from various sources. Components of a CI environment can be integrated, configured, tested and validated before being supplied to an end user, such as a business or other customer. Using the management component 102, the CI environment can be centrally operated and managed, saving time and resources when compared to multi-vendor integrated systems. A CI environment can be scaled and tailored to meet service level agreement (SLA) capabilities.

Software and hardware associated with a management component 102 of a CI environment can manage compute, storage, network and virtualization components 104, 106, 108 and 110 together as a single system and multiple systems as a single pool of resources. The management component 102 provides system health and compliance management, including, but not necessarily limited to, automated inspection capabilities for security and software compliance. The management component 102 can include multiple hardware and software elements to manage the remaining components of a CI environment 100. The management component 102 and possibly other elements of the CI environment 100 can be implemented using one or more management platforms. A management platform can be part of what is more generally referred to herein as a processing platform comprising one or more processing devices each comprising a processor coupled to a memory.

The compute component 104 of a CI environment 100 can also include multiple hardware and software components including, but not necessarily limited to, servers, fabric extenders, interfaces, and interconnects. The compute component 104 can include an analytics platform that can be used for big data analytics, as well as end-user computing. By way of example, a big data analytics platform may comprise a massively parallel processing (MPP) database having an associated library of scalable in-database analytics functions. The compute component 104 and possibly other elements of the CI environment 100 can be implemented using one or more compute platforms. A compute platform can be part of what is more generally referred to herein as a processing platform comprising one or more processing devices each comprising a processor coupled to a memory.

The storage component 106 provides storage, backup and recovery functions, including, but not necessarily limited to, data de-duplication, replication, data security and storage federation capabilities. The storage component 106 and possibly other elements of the CI environment 100 can be implemented using one or more storage platforms. For example, a given storage platform can comprise any of a variety of different types of storage, including network-attached storage (NAS), storage area networks (SANs), direct-attached storage (DAS), distributed DAS and software-defined storage (SDS), as well as combinations of these and other storage types. A given storage platform may comprise storage arrays such as VNX® and Symmetrix VMAX® storage arrays, both commercially available from EMC Corporation of Hopkinton, Mass. Other types of storage products that can be used in implementing a given storage platform in an illustrative embodiment include SDS products such as ScaleIO™, scale-out all-flash storage arrays such as XtremIO™, as well as scale-out NAS clusters comprising Isilon® platform nodes and associated accelerators in the S-Series, X-Series and NL-Series product lines, all commercially available from EMC Corporation. A storage platform can be part of what is more generally referred to herein as a processing platform comprising one or more processing devices each comprising a processor coupled to a memory.

The network and virtualization components 108, 110 are configured to provide networking and virtualization functions including, but not necessarily limited to, remote computing, virtualized data center, and public and/or private cloud capabilities. The network component 108 of a CI environment 100 can include multiple hardware and software components including, but not necessarily limited to, hypervisors, virtual machines, network and fabric switches, and fiber channel and Ethernet components.

The network and virtualization components 108, 110 and possibly other elements of the CI environment 100 can be implemented using one or more network and virtualization platforms. For example, a given virtualization platform may comprise virtualization products such as VMware® vSphere® described further herein, and commercially available from EMC Corporation of Hopkinton, Mass. A given networking platform may comprise networking products such as VMware® vSphere® Distributed Switch (VDS), commercially available from EMC Corporation of Hopkinton, Mass. The virtualization and network platforms can be part of what is more generally referred to herein as a processing platform comprising one or more processing devices each comprising a processor coupled to a memory.

As used herein, a "performance value" can refer to a performance measure of a CI environment or one or more components of the CI environment. A performance measure can include, but is not necessarily limited to, the number of invested service support time periods, maintenance time periods, operational time periods, and monetary costs for running, maintaining and/or servicing a CI environment or one or more components of the CI environment. Time periods can refer to for example, minutes, hours, days, weeks or any other suitable measure of duration.

Illustrative embodiments of the present invention provide a data driven, statistically based approach for evaluating components and their performance in a CI environment, transcending the specific infrastructure properties. Statistics based methods that assume a large quantity of identical products to perform reliability and warranty prediction, are not appropriate for the population of complex products that is found in a CI environment. In addition, sorting and optimizing by business measure produces reports detailing business measures without taking complexity into account. As a result, the reports can contain false alarms regarding products with higher complexity, while low complexity products, which may be anomalous, are not detected.

In an effort to address these deficiencies in conventional processes, embodiments of the present invention provide a supervised machine learning scheme for predicting expected performance values of a CI environment and/or of one or more components of the CI environment based on a configuration of the CI environment. Configuration and performance values of a population of CI environments can be considered in a learning phase of regression coefficients. An applied algorithm automatically learns optimal regression coefficients to model the relationship between features of CI environments and performance values. Updating of the model is relatively easy when presented with new CI environments and/or component configurations.

In addition, in accordance with embodiments of the present invention, a difference between actual and expected performance values of a CI environment as a whole or one or more components of the CI environment is calculated to provide a high-level relation between performance values and hardware components. The existence of anomalous CI environments or CI components is identified based on the difference between actual and expected performance values using statistically derived thresholds. Also, versions of one or more components of a CI environment can be determined to be anomalous using statistically derived values computed based on a plurality of converged infrastructure environments implementing different versions of the one or more components.

Figure 2:
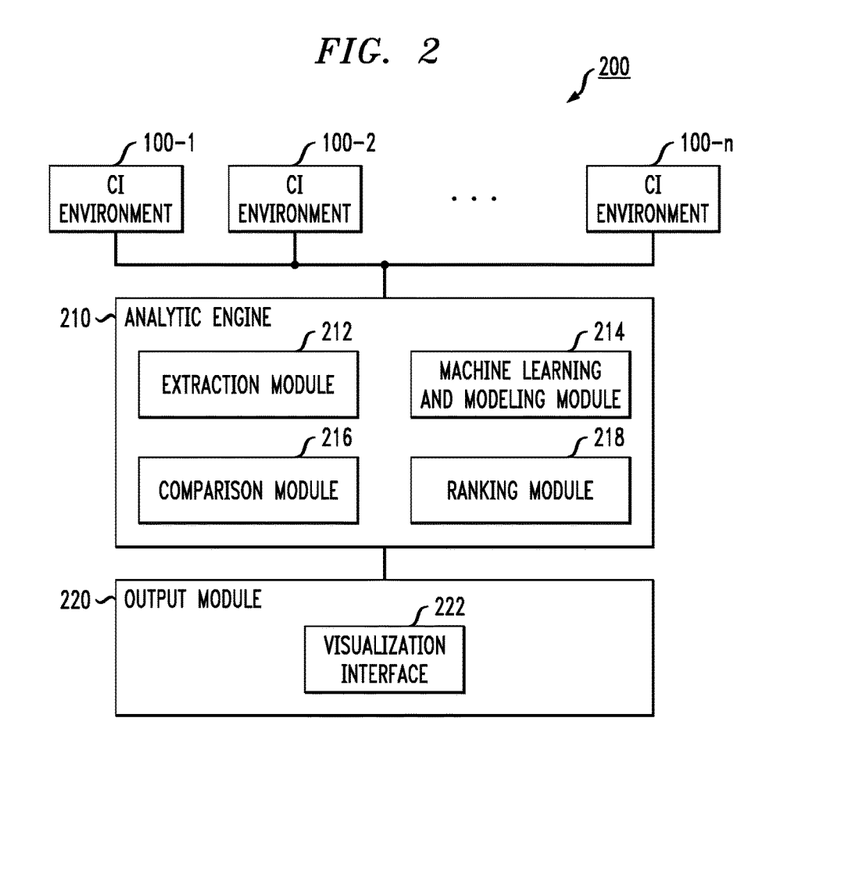
FIG. 2 is a block diagram of an information processing system comprising an analytic engine for evaluation of one or more components of a converged infrastructure environment in an illustrative embodiment of the invention.

FIG. 2 shows an information processing system 200 configured in accordance with an illustrative embodiment of the present invention. The information processing system 200 comprises an analytic engine 210 including an extraction module 212, a machine learning and modeling module 214, a comparison module 216 and a ranking module 218. The information processing system 200 also includes an output module 220 including a visualization interface 222. One or more CI environments 100-1, 100-2 . . . 100-n, like those described in connection with FIG. 1, are coupled to the analytic engine 210.

Communications between the various elements within a CI environment 100, within system 200 and/or between CI environments 100-1, 100-2 . . . 100-n and system 200 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

It should be understood that the particular sets of modules, engines and other components implemented in the CI environment 100 and system 200, as illustrated in FIGS. 1 and 2, are presented by way of example only. In other embodiments, only subsets of these components, or additional or alternative sets of components, may be used, and such components may exhibit alternative functionality and configurations.

While the extraction, machine learning and modeling, comparison and ranking modules 212, 214, 216 and 218 in the FIG. 2 embodiment are shown as being implemented within the analytic engine 210, in other embodiments one or more of the extraction, machine learning and modeling, comparison and ranking modules 212, 214, 216 and 218 can be implemented, at least in part, externally to the analytic engine 210. In accordance with an illustrative embodiment of the present invention, a processing platform implements the analytic engine 210 to evaluate a CI environment as a whole, or one or more components of a CI environment.

As part of performing the evaluation, the extraction module 212 is configured to extract one or more features corresponding to a CI environment, such as any of the CI environments 100-1, 100-2, . . . 100-n. The features include, but are not limited to, product family, product version, number of drives, capacity, number of power supplies and/or a time period a product has been in service. A product family may include, for example, VBLOCK®, VxBLOCK®, VxRACK™ or VxRAIL™ CI systems as noted above, or a family for one or more components 102, 104, 106, 108 and 110 of a CI environment, such as the platforms offered for each of the components. A product version is one of the editions or generations offered within a product family. The number of drives, for example, hard drives, flash drives, or other types of drives is, for example, a numerical value corresponding to how many drives are included in a CI environment, or one or more components 102, 104, 106, 108 and 110 of a CI environment. The extracted features may further specify the types of drives and their corresponding number. Similarly, the number of power supplies corresponds to the numerical value of power supplies in a CI environment or one or more components 102, 104, 106, 108 and 110 of a CI environment, which may further be specified in terms of the type of power supplies. A time period that a product has been in service can correspond to, for example, the amount of time (e.g., days, weeks, months, years, etc.) that a CI environment or one or more components 102, 104, 106, 108 and 110 of a CI environment have been operational for a given user. The terms "user" or "users" as utilized herein is intended to be broadly construed so as to encompass numerous arrangements of human, hardware, software or firmware entities, as well as combinations of such entities.

The time period that a product has been in service can also correspond to, for example, an average duration that the environment or component is in operation over a given time period, for example, a product may be operational for an average 60 hours per week. Another extracted feature can be a duration or average duration that a CI environment or a component of the CI environment is not operational or is being serviced due to, for example, a problem, malfunction and/or maintenance.

A capacity of a CI environment or one or more components 102, 104, 106, 108 and 110 of the CI environment refers to an amount of memory for the CI environment or the one or more components. For example, such values may be measured in gigabytes, terabytes or petabytes.

Based on one or more of the extracted features, the machine learning and modeling module 214 is configured to predict an expected quantitative performance value of a CI environment, or of the one or more components of the CI environment based on the extracted features. The CI environment can be, for example, any of the CI environments 100-1, 100-2, . . . 100-n. The predicting is performed using a multivariate predictive model in which the one or more extracted features are input variables, and an actual quantitative performance value is a target variable.

The computation of the expected quantitative performance values may involve, for example, generating a regression model, for example, a linear regression model, and applying the extracted features to the regression model to generate expected quantitative performance values to create baseline expected quantitative performance values corresponding to the extracted features.

The regression model is a statistical model that predicts an outcome based on a given set of feature values. The particular parameters for the model can be derived at least in part from a training data set relating to a relatively small number of CI environments or components that have been previously analyzed. The trained model can then be used to generate an expected quantitative performance value for any CI environment or component to be evaluated, based on the extracted features.

According to an embodiment of the present invention, the learning and modeling module 214 is configured to implement machine learning processing to learn one or more normalization coefficients to be applied to one or more of the extracted features when using the multivariate predictive model to predict the expected quantitative performance value of the CI environment and the one or more components. The learning and modeling module applies learned normalization coefficients to corresponding ones of the extracted features to establish baseline expected quantitative performance values for the CI environment and/or the one or more components as a function of the corresponding features.

In accordance with an embodiment of the present invention, the regression model incorporates multiple ones of the extracted features described previously, and collectively considers multiple distinct extracted features in computing the expected quantitative performance values. Also, the model can be updated over time to reflect additional or alternative features associated with particular ones of the CI environments 100-1, 100-2, . . . 100-n or the components thereof. This allows the model to be "tuned" over time to reflect variations in the CI environments and their components.

A given regression model utilized by the machine learning and modeling module 214 can be generated in that module, or in another portion or portions of the system 200. It is also possible for the regression model or portions thereof to be generated in an entirely separate system and downloaded into or otherwise provided to the machine learning and modeling module 214.

Embodiments of the invention are not limited to utilizing regression models, and accordingly a regression model may be replaced in other embodiments with, for example, a Poisson model, a Bayesian model or other types of machine learning.

In accordance with a non-limiting illustrative embodiment, the multivariate predictive model can be represented as follows:

$$\hat{y}_n = \sum_{i=1}^{P} \alpha_i x_i \quad (1)$$

In equation (1), $\alpha_1$ represents a normalization coefficient to be learned, $x_1$ represents an extracted feature to which the normalization coefficient corresponds, and $\hat{y}_n$ is the output variable for the expected quantitative performance value in connection with the particular feature(s), representing baseline expected quantitative performance values corresponding to the extracted features. For example, referring to FIG. 3, which is a graphical plot 300 comparing averaged performance values with feature values in an illustrative embodiment of the invention, the curve 310 represents baseline expected quantitative performance values for a given range associated with a feature. As noted above, the extracted features include, but are not limited to, product family, product version, number of drives, capacity, number of power supplies and/or a time period a product has been in service, and the performance value can include, but is not necessarily limited to, the number of invested service support time periods, maintenance time periods, operational time periods, and monetary costs for running, maintaining and/or servicing a CI environment or one or more components of the CI environment. By way of explanation, as a non-limiting example, curve 310 in FIG. 3 can represent baseline expected support hours for a given range of capacity, or baseline expected maintenance costs as a function of the number of drives.

Figure 3:
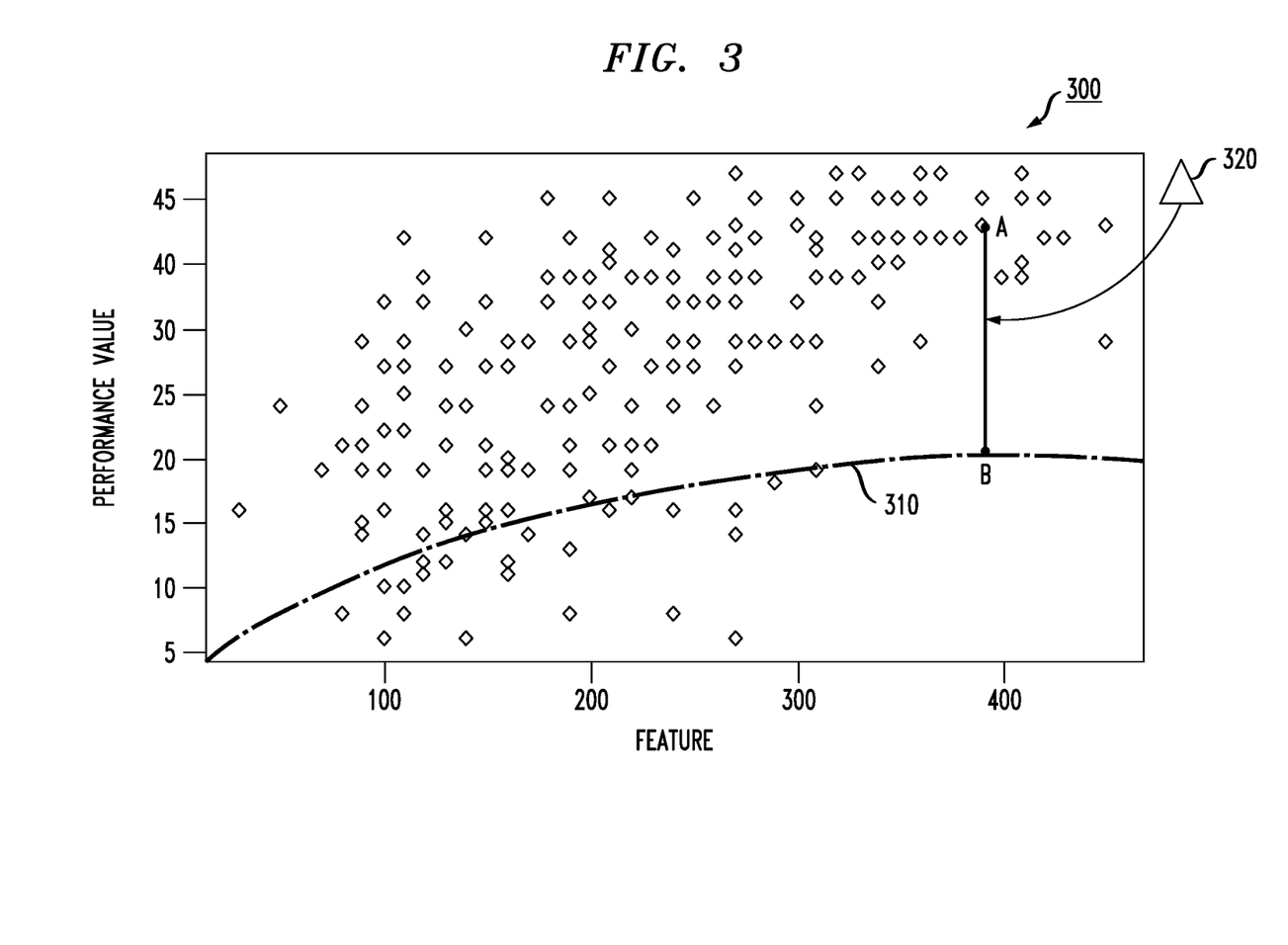
FIG. 3 shows a graphical plot comparing averaged performance values with feature values in an illustrative embodiment of the invention.

The analytic engine 210 further comprises the comparison module 216, which is configured to calculate a difference between an actual quantitative performance value of a CI environment or one or more components of a CI environment and an expected quantitative performance value. For example, referring again to FIG. 3, the various plotted points on the graph 300 represent actual quantitative performance values of a CI environment or one or more components of a CI environment as a function of a particular feature. In keeping with the illustrative example described above, the plotted points may represent actual support hours for a given range of capacity, or actual maintenance costs as a function of the number of drives. The extraction module 212 is configured to extract the actual quantitative performance values from record keeping sources located within the CI environments 100-1, 100-2, . . . 100-n, or from record keeping sources, such as, for example, databases, located external to the CI environments 100-1, 100-2, . . . 100-n and the system 200. The comparison module 216 uses the extracted actual quantitative performance values when calculating the differences between the actual and expected quantitative performance values. Referring to FIG. 3, the Greek letter delta 320 represents a difference between an actual performance value A and an expected quantitative performance value B on the baseline curve 310 as a function of a product feature.

In accordance with a non-limiting illustrative embodiment, the difference between actual and expected quantitative performance values, can be represented as follows:

$$r_n = y_n - \hat{y}_n \quad (2)$$

In equation (2), as noted above, $\hat{y}_n$ corresponds to the expected quantitative performance value in connection with a particular feature, $y_n$ corresponds to the actual quantitative performance value for the given feature, and $r_n$ corresponds to the difference between actual and expected quantitative performance values. A ranking module 218 is configured to rank CI environments or components of CI environments based on the differences between actual and expected quantitative performance values. The differences can be ranked in ascending or descending order.

The ranking module 218 is further configured to determine whether the CI environment or one or more components of a CI environment is anomalous based on whether the difference between the actual quantitative performance value and the expected quantitative performance value exceeds a statistically derived threshold. In accordance with an embodiment of the present invention, the statistically derived threshold is computed using statistical methods for determining outliers. For example, the statistical methods can include, but are not necessarily limited to, normal distribution outlier identification where any values beyond K (K for example can be 2, 3, 4, etc.) standard deviations are considered anomalies. For example, normal distribution outlier identification can include computing the mean and standard deviation of the differences between the actual quantitative performance value and the expected quantitative performance value. According to an exemplary embodiment, each difference below or above the computed mean±four standard deviations is considered an outlier.

Other examples for statistical methods can include a median absolute deviation method, Grubbs' test for outliers, or any distance-based or density-based anomaly detection method.

According to an embodiment of the present invention, the ranking module 218 is further configured to determine whether a version of one or more components of a CI environment is anomalous. For example, different operating system (OS) versions of components can be installed in different CI environments. Using statistically derived values that are computed based on multiple CI environments implementing different OS versions of one or more components, the ranking module 218 determines whether a particular version of a component of a CI environment is anomalous. The determination of whether a particular version of a component of a CI environment is anomalous is based on whether or not a statistical measure of the sub-population of CI's implementing the suspected OS version is significantly anomalous compared to other sub-populations implementing other OS versions. This determination can be done via common statistical tests including, but not necessarily limited to, an analysis of variance (ANOVA) test. Accounting for the behavior of an entire population of CI environments enables proactive detection of cross-field issues. The acquired insights can be directly fed-back to engineering units and used to update internal and external best practices.

Referring to FIG. 2, the output module 220 receives the results of the analysis from the analytic engine 210, including, but not necessarily limited to, the baseline determinations, results of the comparisons between actual and expected performance values, and anomaly and rank determinations. The output module 220 is configured to report the determined anomalies to at least one user via a visualization interface 222 so as to permit the at least one user to take an action with respect to the determined anomalies. According to an embodiment of the present invention, the output module 220 is configured to generate in the visualization interface 222, a plot view visualization that displays actual quantitative performance values as a function of at least one of the extracted one or more features. For example, the plot view can be similar to the plot 300 shown in FIG. 3, which also depicts a baseline curve 310 representing baseline expected quantitative performance values for a CI environment or one or more components of a CI environment.

Figure 4:
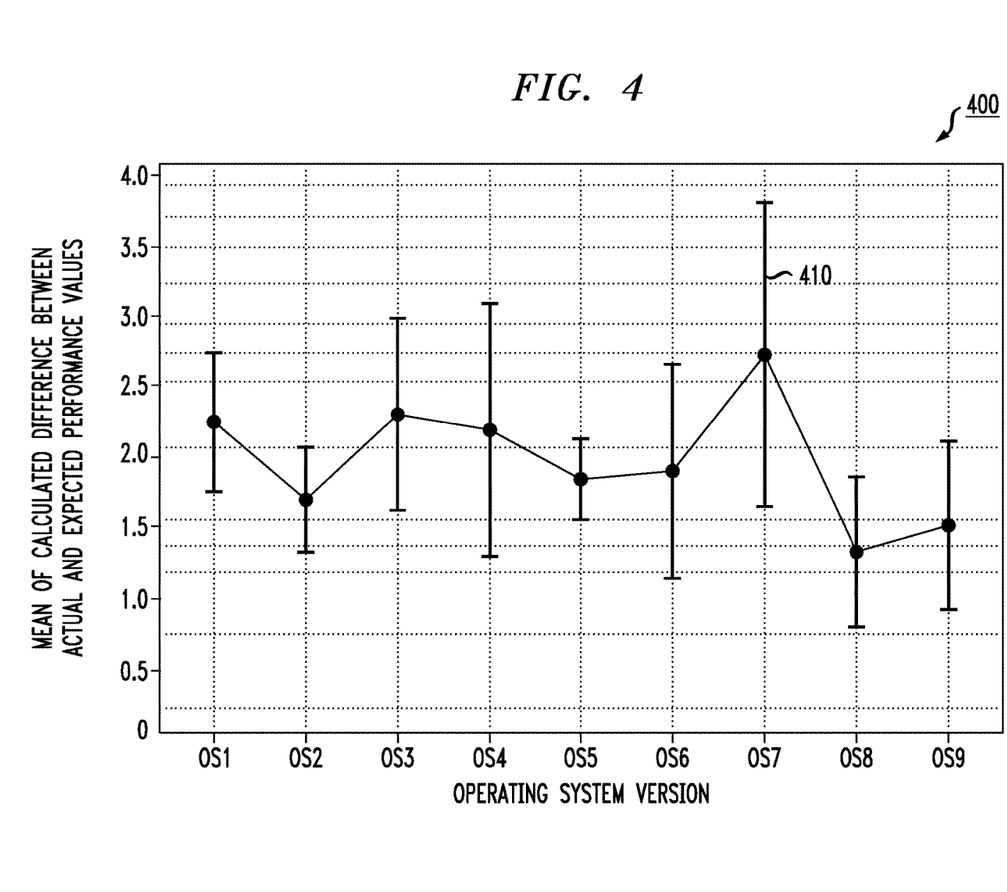
FIG. 4 shows a graphical plot comparing computed difference between actual and expected performance values among various operating system versions in an illustrative embodiment of the invention.

Referring to FIG. 4, a plot view generated in the visualization interface 222 can display a graphical plot comparing computed difference between actual and expected performance values among various OS versions of CI environments or components thereof. Alternatively, the visualization interface 222 can display a graphical plot comparing computed difference between actual and expected performance values among various components of CI environments. As shown in FIG. 4, the graphical plot 400 plots the mean of the calculated difference between actual and expected performance values as a function of OS version, where the error bars 410 represent confidence intervals for the mean of the calculated difference between actual and expected performance values for each OS version. The difference between actual and expected performance values can be measured in its original units or replaced by ranks computed in the ranking module 218.

Each OS version forms a sub-population of CI installations implementing the OS version, such that different statistical measures (including, but not necessarily limited to, mean, median and variance) can be calculated and compared across sub-populations via common statistical tests.

It is to be appreciated that the particular arrangement of CI environment and system components illustrated in FIGS. 1 and 2 is exemplary only, and that numerous other arrangements of components may be used in other embodiments. For example, in other embodiments, functionality described herein as being associated with one or more of the extraction module 212, machine learning and modeling module 214, comparison module 216, ranking module 218, and output module 220 may be implemented at least in part using additional or alternative components of the system 200.

The operation of the information processing system 200 will now be described in further detail with reference to the flow diagram of FIG. 5, which illustrates an exemplary process carried out by the system 200 in one embodiment. The process as shown includes steps 501 through 507. Steps 501 through 507 are assumed to be performed by the analytic engine 210, but one or more of these steps may be performed at least in part by or in conjunction with other system components in other embodiments. Moreover, evaluation of a CI environment and/or one or more components of a CI environment as disclosed herein should not be viewed as being limited in any way to this particular illustrative arrangement of process steps.

In step 501, one or more features corresponding to a CI environment are extracted. As noted above, the features include, but are not limited to, product family, product version, number of drives, capacity, number of power supplies and/or a time period a product has been in service. A product family may include, for example, VBLOCK®, VxBLOCK®, VxRACK™ or VxRAIL™ CI systems as noted above, or a family for one or more components of a CI environment, such as the platforms offered for each of the components. A product version is one of the editions or generations offered within a product family. The number of drives and power supplies is, for example, a numerical value corresponding to how many drives or power supplies are included in a CI environment, or one or more components of a CI environment. A time period that a product has been in service can correspond to, for example, the amount of time (e.g., days, weeks, months, years, etc.) that a CI environment or one or more components of a CI environment have been operational for a given user. A capacity of a CI environment or one or more components of the CI environment refers to an amount of memory for the CI environment or the one or more components.

In step 503, an expected quantitative performance value of the CI environment and/or one or more components of the CI environment is predicted based on the extracted one or more features. In accordance with an embodiment of the present invention, the predicting is performed using a multivariate predictive model in which the one or more extracted features are input variables, and an actual quantitative performance value is a target variable.

As noted previously, the computation of the expected quantitative performance values may involve, for example, generating a regression model, for example, a linear regression model, and applying the extracted features to the regression model to generate expected quantitative performance values to create baseline expected quantitative performance values corresponding to the extracted features.

Machine learning processing may be implemented to learn one or more normalization coefficients to be applied to one or more of the extracted features when using the multivariate predictive model to predict expected quantitative performance values. The learned normalization coefficients may be applied to corresponding ones of the extracted features to establish baseline expected quantitative performance values for the CI environment and/or the one or more components as a function of the corresponding features. Referring to FIG. 3, which is a graphical plot 300 comparing averaged performance values with feature values in an illustrative embodiment of the invention, the curve 310 represents baseline expected quantitative performance values for a given range associated with a feature.

In step 505, a difference between an actual quantitative performance value of the CI environment and/or one or more components of the CI environment and the expected quantitative performance value is calculated. For example, referring again to FIG. 3, the various plotted points on the graph 300 represent actual quantitative performance values of a CI environment or one or more components of a CI environment as a function of a particular feature, and the baseline curve 310 represents expected quantitative performance values as a function of a particular feature. The differences between the points and the curve 310, as illustrated by Greek letter delta 320 in one example, illustrate differences between actual and expected quantitative performance values. The CI environments or components of CI environments can be ranked based on the differences between actual and expected quantitative performance values.

In step 507, it is determined whether the CI environment and/or the one or more components is anomalous based on whether the difference between the actual quantitative performance value and the expected quantitative performance value exceeds a statistically derived threshold. In accordance with an embodiment of the present invention, the statistically derived threshold is computed using statistical methods for determining outliers, such as, for example, normal distribution outlier identification where values beyond K standard deviations out of the mean are considered anomalies. In addition, the entire CI population can be divided into sub-populations implementing one or more different component versions. Statistical measures of these sub-populations can be further extracted and compared via common statistical tests to reveal the anomalous components with respect to its performance in the entire CI population.

Steps 501 through 507 can be repeated periodically or as needed to evaluate additional CI environments and/or additional components of a CI environment or performed in parallel with one another.

Figure 5:
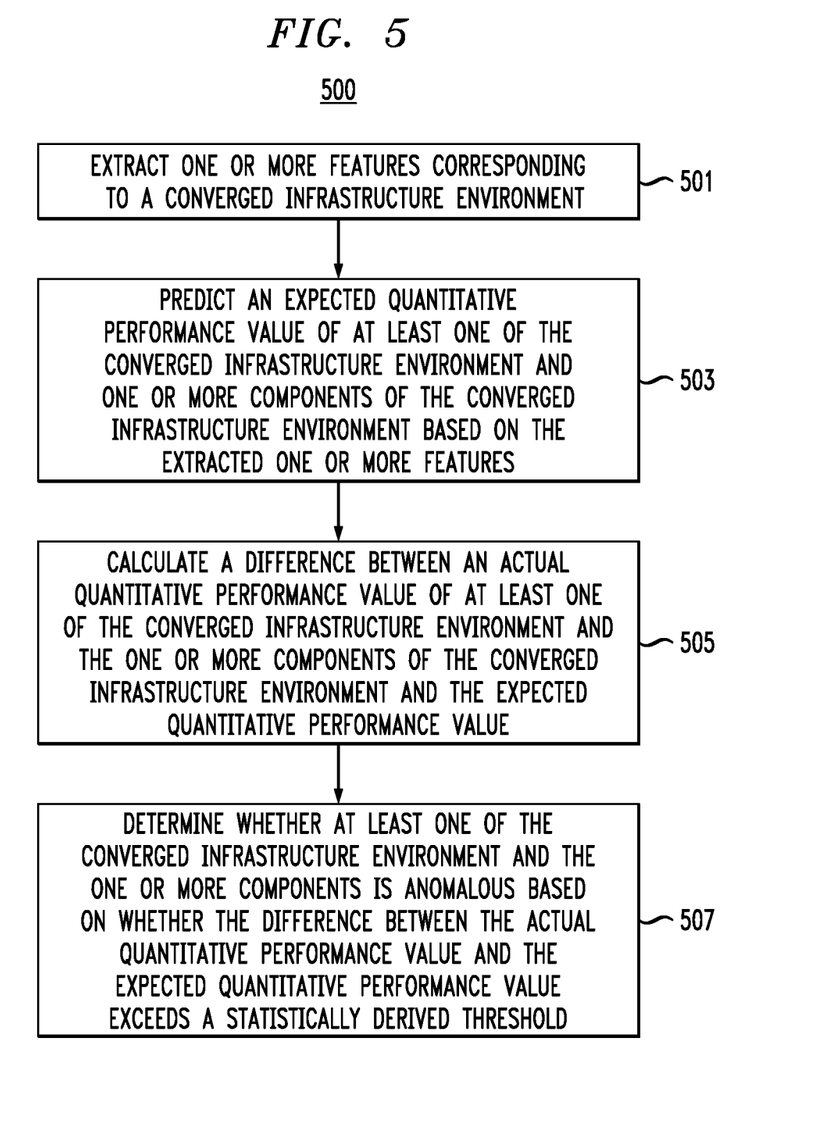
FIG. 5 illustrates a set of example process steps associated with evaluation of a converged infrastructure environment and/or one or more components of the converged infrastructure environment in an illustrative embodiment of the invention.

The particular processing operations and other system functionality described in conjunction with the flow diagram of FIG. 5 is presented by way of illustrative example only, and should not be construed as limiting the scope of the invention in any way. Alternative embodiments can use other types of processing operations involving evaluation of a CI environment and/or one or more components of a CI environment. For example, the ordering of the process steps may be varied in other embodiments, or certain steps may be performed concurrently with one another rather than serially.

It is to be appreciated that functionality such as that described in conjunction with the flow diagram of FIG. 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

The above-described illustrative embodiments provide significant improvements relative to conventional arrangements. For example, one or more such embodiments can evaluate components within a heterogenic population of CI environments so that the amount of resources invested in distinct CI environments of different size and complexity can be compared. One or more embodiments of the present invention compare CI environments or their components based on a representative feature set and against the population of CI environments. More specifically, one or more embodiments of the present invention provide a supervised machine learning scheme for predicting expected performance values of a CI environment and/or of one or more components of the CI environment based on a configuration of the CI environment. An applied algorithm automatically learns optimal regression coefficients to model the relationship between features of CI environments and performance values. In addition, in accordance with embodiments of the present invention, a difference between actual and expected performance values of a CI environment as a whole or one or more components of the CI environment is calculated to provide a high-level relation between performance values and hardware components. The existence of anomalous CI environments or CI components is identified based on the difference between actual and expected performance values using statistically derived thresholds.

It is to be appreciated that the foregoing advantages are illustrative of advantages provided in certain embodiments, and need not be present in other embodiments.

It is to be appreciated that the particular system components, process operations and associated functionality illustrated in FIGS. 1-5 are exemplary only, and numerous other arrangements may be used in other embodiments.

As mentioned previously, at least portions of the information processing system 200 may be implemented using one or more processing platforms. A given such processing platform comprises at least one processing device comprising a processor coupled to a memory, and the processing device may be implemented at least in part utilizing one or more virtual machines, containers or other virtualization infrastructure.

Illustrative embodiments of such platforms will now be described in greater detail. Although described in the context of system 200, these platforms may also be used to implement at least portions of the information processing system of FIG. 2, as well as other information processing systems in other embodiments of the invention.

Figure 6:
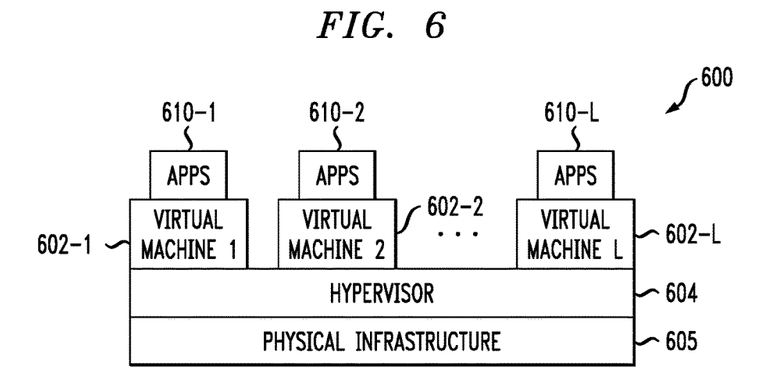
FIGS. 6 and 7 show examples of processing platforms that may be utilized to implement at least parts of an information processing system in illustrative embodiments.

As shown in FIG. 6, portions of the information processing system 100 may comprise cloud infrastructure 600. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 200 may of course include multiple hypervisors each providing a set of virtual machines using at least one underlying physical machine. Different sets of virtual machines provided by one or more hypervisors may be utilized in configuring multiple instances of various components of the system 200.

An example of a commercially available hypervisor platform that may be used to implement hypervisor 604 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as the above-noted VNX® and Symmetrix VMAX®. A variety of other storage products may be utilized to implement at least a portion of the system 200.

One or more of the processing modules or other components of system 200 may therefore each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

Figure 7:
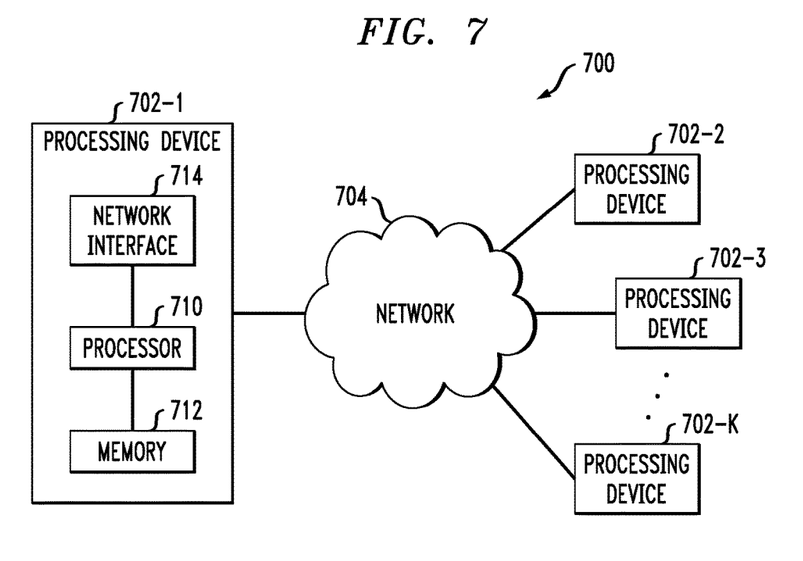

The processing platform 700 in this embodiment comprises a portion of system 200 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 200 may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, such as container-based virtualization infrastructure using Docker containers or other types of containers, in place of or in addition to virtualization infrastructure comprising virtual machines.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 200. Such components can communicate with other elements of the information processing system 200 over any type of network or other communication media.

Components of an information processing system as disclosed herein can be implemented at least in part in the form of one or more software programs stored in memory and executed by a processor of a processing device such as one of the virtual machines 602 or one of the processing devices 702.

It should again be emphasized that the above-described embodiments of the invention are presented for purposes of illustration only. Many variations and other alternative embodiments may be used. For example, the disclosed techniques are applicable to a wide variety of other types of information processing systems, processing devices, and other components. Also, the particular configurations of system and environment elements shown in FIGS. 1, 2, 6 and 7 and the process operations shown in FIG. 5 can be varied in other embodiments. Thus, for example, the particular type of information processing systems deployed in a given embodiment and their respective configurations may be varied. Other features of the illustrative embodiments can also be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a processing platform configured to implement an analytic engine for evaluation of at least one of a plurality of converged infrastructure environments and one or more components of the plurality of converged infrastructure environments;
wherein the one or more components of the plurality of converged infrastructure environments comprise at least a virtualization component implemented using a virtualization platform comprising at least one of one or more virtual machines and one or more containers;
wherein the plurality of converged infrastructure environments each implement different versions of the virtualization component;
wherein the plurality of converged infrastructure environments are connected to the analytic engine over at least one network;
wherein the analytic engine comprises:
an extraction module configured to extract one or more features corresponding to the plurality of converged infrastructure environments, wherein the extracted one or more features comprise at least the different versions of the virtualization component;
a learning and modeling module configured to predict an expected quantitative performance value of at least one of the plurality of converged infrastructure environments and the one or more components of the converged infrastructure environment based on the extracted one or more features; and a comparison module configured to calculate a difference between an actual quantitative performance value of at least one of the plurality of converged infrastructure environments and the one or more components of the plurality of converged infrastructure environments and the expected quantitative performance value; and a ranking module configured to determine whether at least one of the plurality of converged infrastructure environments and the one or more components is anomalous based on whether the difference between the actual quantitative performance value and the expected quantitative performance value exceeds a statistically derived threshold;

wherein the ranking module is further configured to determine whether a version of the virtualization component is anomalous using statistically derived values computed based on the plurality of converged infrastructure environments implementing the different versions of the virtualization component; and an output module connected to the analytic engine over at least one network wherein the output module is configured to:

report the determined anomalies to at least one user via a visualization interface so as to permit the at least one user to take an action with respect to the determined anomalies; and generate in the visualization interface a plot view visualization that displays actual quantitative performance values as a function of at least the different versions of the virtualization component of the plurality of converged infrastructure environments;

wherein the processing platform comprises one or more processing devices each comprising a processor coupled to a memory.

2. The apparatus of claim 1 wherein the ranking module is further configured to rank at least one of the plurality of converged infrastructure environments and the one or more components based on the difference between the actual quantitative performance value and the expected quantitative performance value.

3. The apparatus of claim 1 wherein the predicting is performed using a multivariate predictive model in which the extracted one or more features are input variables.

4. The apparatus of claim 3 wherein the learning and modeling module is further configured to implement machine learning processing to learn one or more normalization coefficients to be applied to the extracted one or more features when using the multivariate predictive model to predict the expected quantitative performance value of at least one of the plurality of converged infrastructure environments and the one or more components.

5. The apparatus of claim 4 wherein the learning and modeling module is further configured to apply a learned normalization coefficient to a corresponding one of the extracted one or more features to establish baseline expected quantitative performance values for at least one of the plurality of converged infrastructure environments and the one or more components.

6. The apparatus of claim 3 wherein the multivariate predictive model is a regression model.

7. The apparatus of claim 1 wherein the extracted one or more features further comprise at least one of product family, number of drives, capacity, number of power supplies and a time period a product has been in service.

8. The apparatus of claim 1 wherein the expected and actual quantitative performance values comprise one of support time periods, maintenance time periods, monetary costs, and operational time periods.

9. The apparatus of claim 1 wherein the plot view visualization further displays baseline expected quantitative performance values for at least one of the plurality of converged infrastructure environments and the one or more components.

10. The apparatus of claim 1 wherein the one or more components of the converged infrastructure environment further comprise at least one of a management component, a compute component, a storage component and a network component.

11. An information processing system comprising the apparatus of claim 1.

12. The apparatus of claim 1 wherein:
the plurality of converged infrastructure environments each implement different versions of the virtualization platform; and
the extracted one or more features further comprise the different versions of the virtualization platform.

13. A method comprising:
extracting one or more features corresponding to a plurality of converged infrastructure environments;
predicting an expected quantitative performance value of at least one of the plurality of converged infrastructure environments and one or more components of the plurality of converged infrastructure environments based on the extracted one or more features;
calculating a difference between an actual quantitative performance value of at least one of the plurality of converged infrastructure environments and the one or more components of the plurality of converged infrastructure environments and the expected quantitative performance value; and
determining whether at least one of the plurality of converged infrastructure environments and the one or more components is anomalous based on whether the difference between the actual quantitative performance value and the expected quantitative performance value exceeds a statistically derived threshold;
wherein the one or more components of the plurality of converged infrastructure environments comprise at least a virtualization component implemented using a virtualization platform comprising at least one of one or more virtual machines and one or more containers;
wherein the plurality of converged infrastructure environments each implement different versions of the virtualization component;
wherein the extracted one or more features comprise at least the different versions of the virtualization component;
wherein the method further comprises:
determining whether a version of the virtualization component is anomalous using statistically derived values computed based on the plurality of converged infrastructure environments implementing the different versions of the virtualization component;
reporting the determined anomalies to at least one user via a visualization interface so as to permit the at least one user to take an action with respect to the determined anomalies; and
generating in the visualization interface a plot view visualization that displays actual quantitative performance values as a function of at least the different versions of the virtualization component of the plurality of converged infrastructure environments; and wherein the steps of the method are implemented using at least one processing device comprising a processor coupled to a memory.

14. The method of claim 13 wherein the predicting is performed using a multivariate predictive model in which the extracted one or more features are input variables.

15. The method of claim 14 further comprising implementing machine learning processing to learn one or more normalization coefficients to be applied to the extracted one or more features when using the multivariate predictive model to predict the expected quantitative performance value of at least one of the plurality of converged infrastructure environments and the one or more components.

16. The method of claim 15 wherein a learned normalization coefficient is applied to a corresponding one of the extracted one or more features to establish baseline expected quantitative performance values for at least one of the plurality of converged infrastructure environments and the one or more components.

17. The method of claim 13 wherein:
the plurality of converged infrastructure environments each implement different versions of the virtualization platform; and
the extracted one or more features further comprise the different versions of the virtualization platform.

18. A computer program product comprising a non-transitory processor-readable storage medium having stored therein program code of one or more software programs, wherein the program code when executed by at least one processing device causes said processing device:
to extract one or more features corresponding to a plurality of converged infrastructure environments;
to predict an expected quantitative performance value of at least one of the plurality of converged infrastructure environments and one or more components of the plurality of converged infrastructure environments based on the extracted one or more features;
to calculate a difference between an actual quantitative performance value of at least one of the plurality of converged infrastructure environments and the one or more components of the plurality of converged infrastructure environments and the expected quantitative performance value; and
to determine whether at least one of the plurality of converged infrastructure environments and the one or more components is anomalous based on whether the difference between the actual quantitative performance value and the expected quantitative performance value exceeds a statistically derived threshold;

wherein the one or more components of the plurality of converged infrastructure environments comprise at least a virtualization component implemented using a virtualization platform comprising at least one of one or more virtual machines and one or more containers;

wherein the plurality of converged infrastructure environments each implement different versions of the virtualization component;

wherein the extracted one or more features comprise at least the different versions of the virtualization component;

wherein the program code when executed by at least one processing device further causes said processing device to:
determine whether a version of the virtualization component is anomalous using statistically derived values computed based on the plurality of converged infrastructure environments implementing the different versions of the virtualization component;
report the determined anomalies to at least one user via a visualization interface so as to permit the at least one user to take an action with respect to the determined anomalies; and
generate in the visualization interface a plot view visualization that displays actual quantitative performance values as a function of at least the different versions of the virtualization component of the plurality of converged infrastructure environments.

19. The computer program product of claim 18 wherein the predicting is performed using a multivariate predictive model in which the extracted one or more features are input variables.

20. The computer program product of claim 18 wherein:
the plurality of converged infrastructure environments each implement different versions of the virtualization platform; and
the extracted one or more features further comprise the different versions of the virtualization platform.

* * * * *